(12) United States Patent
Qiu et al.

(10) Patent No.: US 10,708,056 B2
(45) Date of Patent: Jul. 7, 2020

(54) INFORMATION PROCESSING METHOD, TERMINAL AND COMPUTER STORAGE MEDIUM

(71) Applicant: TENCENT TECHNOLOGY (SHENZHEN) COMPANY LIMITED, Shenzhen, Guangdong (CN)

(72) Inventors: Zhiguang Qiu, Shenzhen (CN); Xin Hou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 156 days.

(21) Appl. No.: 15/692,228

(22) Filed: Aug. 31, 2017

(65) Prior Publication Data
US 2018/0026789 A1 Jan. 25, 2018

Related U.S. Application Data

(63) Continuation of application No. PCT/CN2016/080561, filed on Apr. 28, 2016.

(30) Foreign Application Priority Data

Sep. 8, 2015 (CN) .......................... 2015 1 0567786

(51) Int. Cl.
H04L 9/32 (2006.01)
G06F 21/36 (2013.01)
(Continued)

(52) U.S. Cl.
CPC ............ H04L 9/3226 (2013.01); G06F 21/36 (2013.01); H04L 9/0643 (2013.01);
(Continued)

(58) Field of Classification Search
CPC ... H04L 9/3226; H04L 9/3228; H04L 9/3231; H04L 9/3236; H04L 63/08;
(Continued)

(56) References Cited

U.S. PATENT DOCUMENTS 7,430,758 B2 9/2008 Toutonghi
9,384,519 B1* 7/2016 Tripp .................... G06F 16/907
(Continued)

FOREIGN PATENT DOCUMENTS

CN 102137077 A 7/2011
CN 102354354 A 2/2012
(Continued)

OTHER PUBLICATIONS

International Search Report in international application No. PCT/CN2016/080561, dated Aug. 3, 2016.
(Continued)

Primary Examiner — Huan V Doan
(74) Attorney, Agent, or Firm — Anova Law Group, PLLC

(57) ABSTRACT

An information processing method, a terminal and a computer storage medium are disclosed. Here, the information processing method includes that: information of a first image is pre-acquired, and a first encryption key is generated and stored; information of a second image is acquired; a first image characteristic and second image characteristic of the information of the second image are extracted, wherein the first image characteristic represents background information of the first image, and the second image characteristic represents foreground information of the first image; a third image characteristic is obtained on the basis of the first image characteristic and the second image characteristic, and the third image characteristic is determined as a second encryption key; and similarity matching is performed on the
(Continued)

second encryption key and the pre-stored first encryption key to generate a matching result, and a second image is authenticated according to the matching result.

20 Claims, 9 Drawing Sheets

(51) Int. Cl.

| | | |
|---|---|---|
| *H04L 29/06* | (2006.01) | |
| *H04W 12/06* | (2009.01) | |
| *H04L 9/06* | (2006.01) | |
| *H04L 9/08* | (2006.01) | |
| *H04L 9/14* | (2006.01) | |

(52) U.S. Cl.
CPC .......... *H04L 9/0861* (2013.01); *H04L 9/0894* (2013.01); *H04L 9/14* (2013.01); *H04L 63/08* (2013.01); *H04W 12/06* (2013.01)

(58) Field of Classification Search
CPC ..... H04L 63/0861; H04L 9/0643; H04L 9/14; H04L 9/0894; H04L 9/0861; H04W 12/06; G06F 21/36; G06F 2221/2133; G06K 9/6892
See application file for complete search history.

(56) References Cited

U.S. PATENT DOCUMENTS

| | | | | |
|---|---|---|---|---|
| 2005/0129281 A1* | 6/2005 | Ashizaki | ................ | G03H 1/268 382/112 |
| 2005/0177867 A1 | 8/2005 | Toutonghi | | |
| 2011/0185402 A1* | 7/2011 | Wang | ..................... | G06F 21/32 726/5 |
| 2011/0231909 A1 | 9/2011 | Shibuya | | |
| 2012/0139693 A1 | 6/2012 | Zucker | | |
| 2013/0015946 A1* | 1/2013 | Lau | ........................ | G07C 9/00 340/5.2 |
| 2013/0269013 A1* | 10/2013 | Parry | .................. | H04L 63/0861 726/7 |
| 2014/0289534 A1 | 9/2014 | Parry et al. | | |
| 2015/0030216 A1* | 1/2015 | Abe | .................... | G06K 9/00067 382/124 |
| 2015/0269433 A1* | 9/2015 | Amtrup | ............... | G06Q 20/3276 382/115 |
| 2015/0294100 A1* | 10/2015 | King | .................. | G06K 9/00221 726/19 |
| 2015/0379256 A1 | 12/2015 | Parry et al. | | |
| 2016/0034673 A1* | 2/2016 | Chandra | ................ | G06F 21/31 726/7 |
| 2016/0292524 A1* | 10/2016 | Weiss | ................. | G07C 9/00158 |
| 2017/0193215 A1 | 7/2017 | Parry et al. | | |

FOREIGN PATENT DOCUMENTS

| | | |
|---|---|---|
| CN | 103345599 A | 10/2013 |
| CN | 103986578 A | 8/2014 |
| CN | 104618113 A | 5/2015 |

OTHER PUBLICATIONS

Written Opinion of the International Search Authority in international application No. PCT/CN2016/080561, dated Aug. 3, 2016.
Supplementary European Search Report in European application No. 16843433.0, dated Jan. 22, 2018.
The State Intellectual Property Office of the People's Republic of China (SIPO) Office Action 1 for 201510567786.X dated Oct. 31, 2019 9 Pages (including translation).
Meng Li, "Application of Image Classification based on Fisher Vector with Feature Selection", Chinese Master's Theses Full-text Database, Information Science and Technology, No. 6, Jun. 15, 2014, pp. 8 and 61 Total 91 Pages.

* cited by examiner

INFORMATION PROCESSING METHOD, TERMINAL AND COMPUTER STORAGE MEDIUM

CROSS REFERENCE TO RELATED APPLICATIONS

This is a continuation application of International Patent Application No. PCT/CN2016/080561, filed on Apr. 28, 2016, which claims priority to Chinese Patent Application No. 201510567786.X, filed before Chinese Patent Office on Sep. 8, 2015 and entitled "Information Processing Method and Terminal". The disclosure of the application is incorporated by reference herein in its entirety.

TECHNICAL HELD

The disclosure relates to the technical field of communications, and in particular, to an information processing method, a terminal and a computer storage medium.

BACKGROUND

A conventional password is a password formed by an alphanumeric character string, and a user is required to remember own character string password, and inputs this password when verification is required.

Adopting an existing password verification manner cannot provide good user experiences, and is not so convenient. A password which is too complicated is inconvenient to memorize and input. A password which is too simple is lower in security and easy to imitate, and a hacker may make an identical password for verification without cost after acquiring a character string password of a user. Therefore, providing an information processing solution for enabling a user to conveniently and accurately memorize a password and enhancing password checking security has become a technical problem urgent to be solved.

SUMMARY

In view of this, embodiments of the disclosure are intended to provide an information processing method, a terminal and a computer storage medium, which may at least solve the problem of a conventional art and improve user experiences.

The technical solutions of the embodiments of the disclosure are implemented as follows.

The embodiments of the disclosure provide an information processing method, which may include that: information of a first image is pre-acquired and a first encryption key is generated and stored, the method further including that:

information of a second image is acquired;

a first image characteristic and a second image characteristic of the information of the second image are extracted, wherein the first image characteristic may represents background information of the first image, and the second image characteristic may represents foreground information of the first image, the foreground information represents information of one or more objects in the first image which are acquired as a category of main objects during pre-acquiring of the first image, and the background information represents information of the remaining portions of the first image excluding the category of the main objects;

a third image characteristic is obtained on the basis of the first image characteristic and the second image characteristic, and the third image characteristic is determined as a second encryption key; and similarity matching is performed on the second encryption key and the pre-stored first encryption key to generate a matching result, and a second image is authenticated according to the matching result.

The embodiments of the disclosure further provide a terminal, which may include one or more processors executing computer readable instructions for an acquisition unit, a first processing unit, a second processing unit and a matching unit, wherein the acquisition unit may be configured to pre-acquire information of a first image and acquire information of a second image;

the first processing unit may be configured to generate and store a first encryption key on the basis of the information of the first image;

the second processing unit may be configured to extract a first image characteristic and a second image characteristic of the information of the second image, obtain a third image characteristic on the basis of the first image characteristic and the second image characteristic, and determine the third image characteristic as a second encryption key, wherein the first image characteristic may represents background information of the first image, and the second image characteristic may represents foreground information of the first image, the foreground information represents information of one or more objects in the first image which are acquired as a category of main objects during pre-acquiring of the first image, and the background information represents information of the remaining portions of the first image excluding the category of the main objects; and the matching unit may be configured to perform similarity matching on the second encryption key and the pre-stored first encryption key to generate a matching result, and authenticate a second image according to the matching result.

The embodiments of the disclosure further provide a computer storage medium, in which a computer-executable instruction may be stored, the computer-executable instruction being configured to execute the abovementioned information processing method.

According to the embodiments of the disclosure, the information of the first image is pre-acquired, and the first encryption key is generated and stored; during authentication, the information of the second image is acquired, and the first image characteristic and the second image characteristic of the information of the second image are extracted, wherein the first image characteristic represents the background information of the first image, and the second image characteristic represents the foreground information of the first image; the third image characteristic is obtained on the basis of the first image characteristic and the second image characteristic, and the third image characteristic is determined as the second encryption key; and similarity matching is performed on the second encryption key and the pre-stored first encryption key, and the second image is authenticated according to the matching result. In such a manner, the first encryption key is generated by the information of the first image, so that a user may conveniently and accurately memorize an image password, and user experiences are improved; and during authentication, the image information is acquired again, and authentication through the encryption key generated by the acquired image information may enhance password checking security.

DETAILED DESCRIPTION

Implementation of the technical solutions will be further described below in detail with reference to the drawings.

Figure 1:
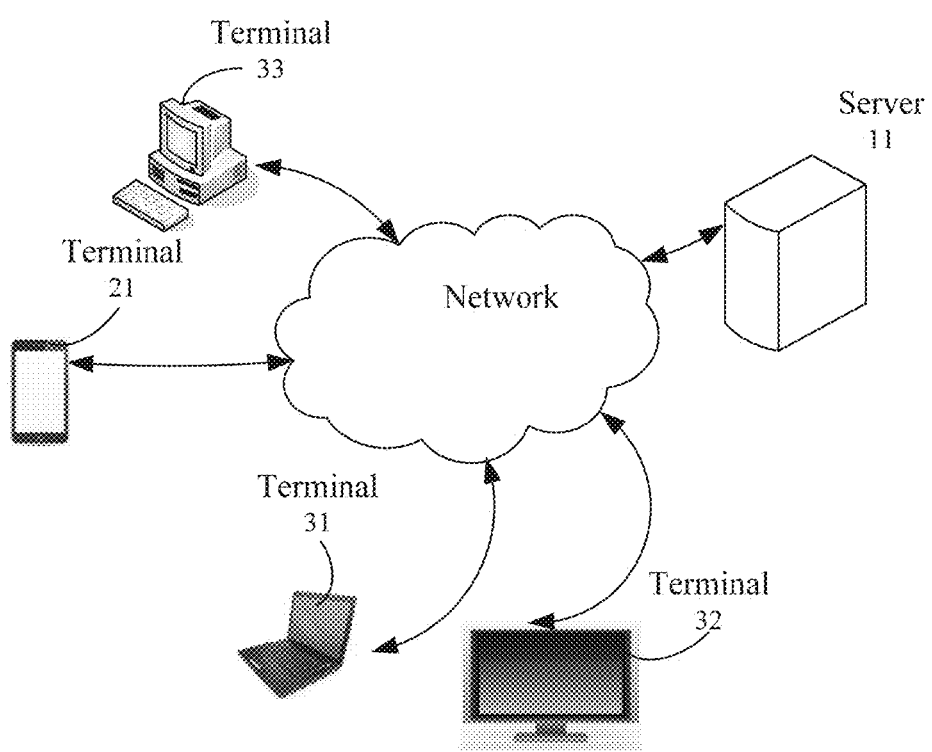
FIG. 1 is a schematic diagram of various hardware entities involved in information interaction according to an embodiment of the disclosure.

FIG. 1 is a schematic diagram of various hardware entities involved in information interaction according to an embodiment of the disclosure. In FIG. 1, three types of hardware entities are included, i.e. a server 11, a terminal 21 and terminals 31-33. The terminal 21 may be a mobile phone terminal, and the terminals 31-33 may include desktop computers, Personal Computers (PCs), all-in-one computers and the like. The terminal 21 and the terminals 31-33 may perform information interaction with the server 11 through a network.

Based on the architecture diagram of various hardware entities in FIG. 1, the embodiments of the disclosure are mainly implemented as follows: a terminal (such as the terminal 21 and the terminals 31-33) pre-acquires information of a first image, generates a first encryption key, and sends the first encryption key to a server, such as the server 11, for storage through the network or stores the first encryption key in the terminal itself; the terminal acquires information of a second image, and extracts a first image characteristic and a second image characteristic of the information of the second image, wherein the first image characteristic represents background information of the first image, and the second image characteristic represents foreground information of the first image; a third image characteristic is obtained on the basis of the first image characteristic and the second image characteristic, and the third image characteristic is determined as a second encryption key; and the second encryption key is sent to the server, and the server performs similarity matching on the second encryption key and the pre-stored first encryption key through the server and authenticates the second image according to a matching result, or the terminal performs similarity matching on the second encryption key to generate a matching result and the pre-stored first encryption key and authenticates the second image according to the matching result.

In the disclosure, the terminal may be any one of the terminal 21 and the terminals 31-33 in FIG. 1. Based on the structure in FIG. 1, various embodiments of the disclosure are proposed below.

First Embodiment

Figure 2:
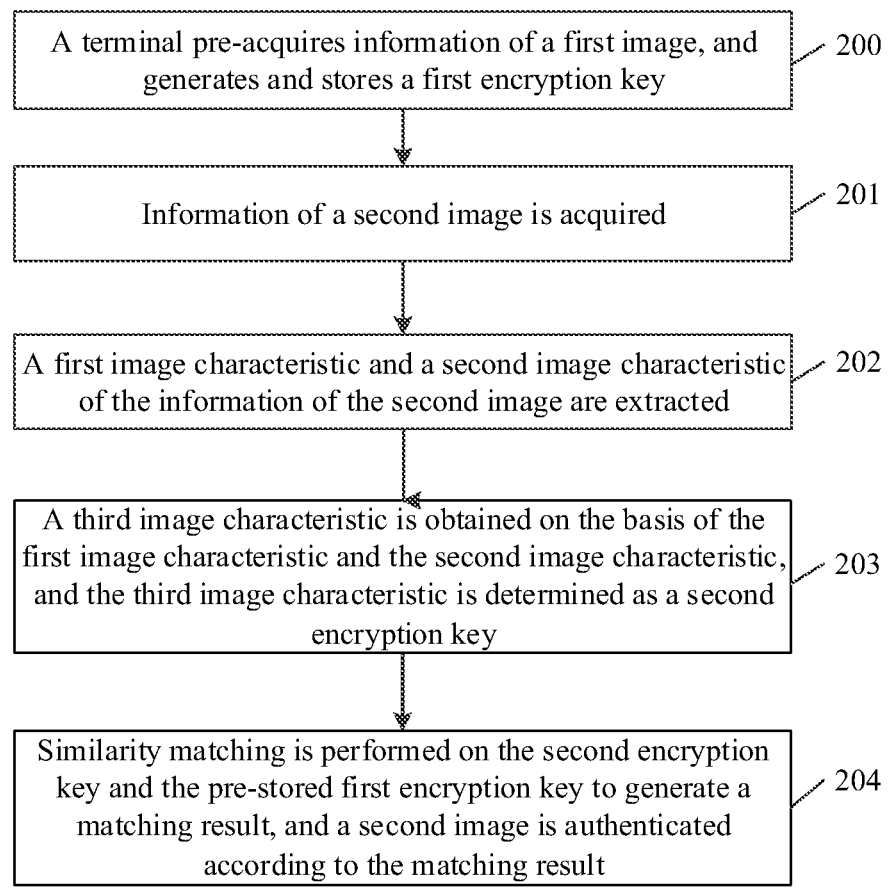
FIG. 2 is an implementation flowchart of a first embodiment of the disclosure.

FIG. 2 shows an information processing method according to an embodiment of the disclosure. As shown in FIG. 2, the information processing method includes the following steps.

In step 200, a terminal pre-acquires information of a first image, and generates and stores a first encryption key.

Here, the operation that the information of the first image is pre-acquired and the first encryption key is generated includes that:

the terminal acquires first prompting information from a user interface of the terminal, acquires the information of the first image in response to the first prompting information, and generates the first encryption key on the basis of the information of the first image.

Here, the first prompting information may be information for prompt that an encryption key need to be set when a user is registered in and logs in a certain Application (APP) of a terminal or encryption setting prompting information for a local APP function of the terminal.

The information of the first image may be acquired through a camera on the terminal.

The information of the first image may include foreground information and background information. In an example shown in FIG. 3, the foreground information may be a certain gesture, shot by the camera, of the user, or any target object which is shot, such as a cup. The background information may be information, except the object determined as the foreground information, in the whole picture. For example, the foreground information is a specific cup, and the background information is a table on which the cup is placed. In other words, the foreground information represents information of one or more objects in the first image which are acquired as a category of main objects during pre-acquiring of the first image, and the background information represents information of the remaining portions of the first image excluding the category of the main objects.

Based on the embodiment of the disclosure, during a practical application, after the information of the first image is acquired, the method further includes that: the information of the first image is stored to enable the user to directly extract the stored image information for authentication as information of a second image in subsequent authentication.

The operation that the first encryption key is generated on the basis of the information of the first image includes that:

the terminal performs Histogram of Oriented Gradient (HOG) characteristic extraction on the information of the first image to acquire a HOG characteristic vector corresponding to the foreground information of the information of the first image, acquires a perceptual hash value corresponding to the background information in the information of the first image by adopting a Perceptual Hash Algorithm (PHA), and generates the first encryption key configured to authenticate and identify the information of the first image on the basis of the HOG characteristic vector and the perceptual hash value.

Here, the operation that the first encryption key configured to authenticate and identify the information of the first image is generated on the basis of the HOG characteristic vector and the perceptual hash value includes that:

the terminal converts the perceptual hash value into a corresponding characteristic vector, and joints the characteristic vector and the HOG characteristic vector together to obtain a characteristic vector configured to identify the information of the first image, i.e. the first encryption key configured to authenticate and identify the information of the first image.

Based on the embodiment of the disclosure, during the practical application, when the terminal acquires the information of the first image, the method may further include that: a parameter regulation prompt, which is configured to regulate image acquisition parameters, is generated to make an acquired first image clear and stable. The image acquisition parameters may be light, a focal length and the like.

Based on the embodiment of the disclosure, during the practical application, after the operation that the information of the first image is pre-acquired, the method further includes that:

the terminal synchronizes the acquired information of a first image to a first terminal for the first terminal to store the information of the first image. In such a manner, during an authentication operation of the user, the first terminal may re-synchronize the information of the first image to the terminal as the information of the second image, so that a process that the terminal acquires the information of the second image is omitted. Alternatively, the information of the first image stored in the first terminal is directly used for image acquisition of the terminal as the information of the second image. Alternatively, the information of the first image stored in the first terminal is printed/developed into a clear picture as the information of the second image for image acquisition of the terminal, so that a second image is not required to be constructed.

Here, the first terminal is another user terminal different from the terminal, or a desktop computer, a PC, an all-in-one computer or the like.

Based on the embodiment of the disclosure, during the practical application, after the operation that the information of the first image is pre-acquired, the method further includes that:

N pieces of image information within N image regions of the information of the first image are extracted, and the N pieces of image information are determined and stored as authentication prompting information.

Here, N is a positive integer. A specific numerical value of N may be set according to a practical requirement. For example, the value of N may be 2, 3 or the like.

The N image regions may be N preset fixed image regions. For example, the value of N is 2. Two fixed image regions are a first region in a left upper corner of the first image and a second region in a right lower corner of the first image respectively. Both the first region and the second region are squares with side lengths a. The value of a may be set according to a requirement. Of course, the first region and the second region may also be rectangles or any other shapes of which side lengths are specific values.

Alternatively, the N image regions may also be N image regions, randomly determined by the terminal, in the first image. The shapes, sizes and the like of the N image regions may be the same or different.

The authentication prompting information is configured to prompt the user of a content of the information of the first image in an authentication process. The authentication prompting information may include part of the foreground information and/or part of the background information in the information of the first image.

It is to be noted that Step 200 is only required to be executed when the method of the embodiment of the disclosure is applied for the first time and the first encryption key may be directly applied subsequently.

In step 201, information of a second image is acquired.

Before the step, the method further includes that:

the terminal acquires the authentication prompting information, and correspondingly displays the authentication prompting information on the user interface of the terminal according to a region, where the authentication prompting information is located, in the first image. Therefore, the user may rapidly remember the corresponding information of a first image when the first encryption key is set.

Here, the operation that the authentication prompting information is acquired includes that: the terminal acquires the authentication prompting information locally stored in the terminal.

Figure 3:
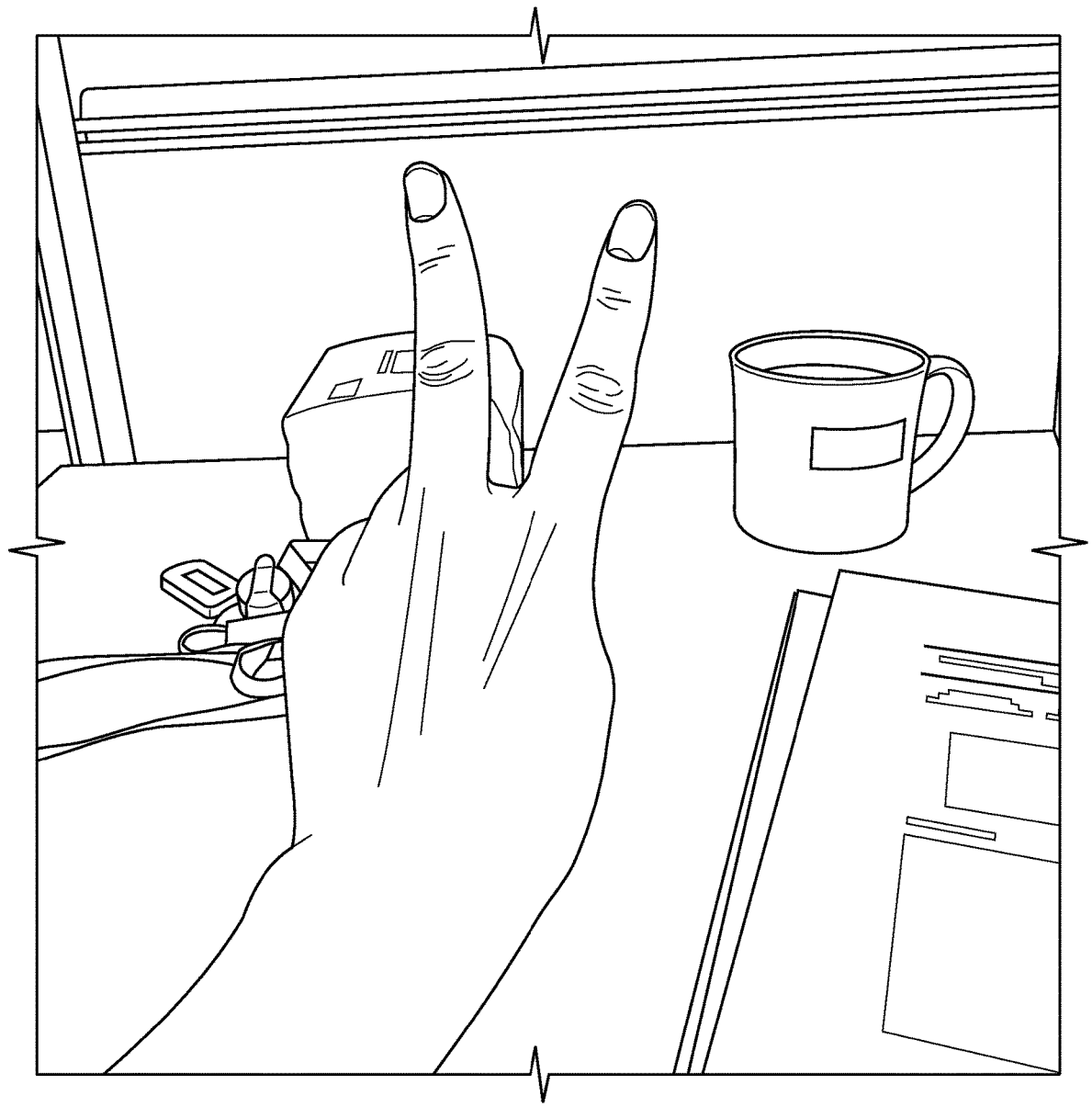
FIG. 3 is a schematic diagram of a first image according to an embodiment of the disclosure.

The information of the second image is image information required when the user performs encryption key verification for an operation of unlocking, login or the like. In a practical application process, the second image is a reproduced scenario of the content of the first image. For example, the first image is a V-shaped gesture made by the user at an office table, as shown in FIG. 3, and the second image is a reproduced scenario of the content of the image, that is, the user remakes the V-shaped gesture at the office table.

In step 202, a first image characteristic and a second image characteristic of the information of the second image are extracted.

Here, the first image characteristic represents the background information of the first image, and the second image characteristic represents the foreground information of the first image.

The step specifically includes that: the terminal acquires a hash value corresponding to the information of the second image, determines the hash value as the first image characteristic, performs information extraction on the information of the second image to obtain a first characteristic vector corresponding to the information of the second image, and determines the first characteristic vector as the second image characteristic.

Here, the operation that the hash value corresponding to the information of the second image is acquired includes that: the terminal acquires a hash value corresponding to the second image by adopting the PHA, specifically including: 1) scaling-down of the second image: since a method for removing high frequencies and details most fast and only reserving structural light and shades is scaling-down of the second image, the second image is scaled down to an 8×8 size, totally including 64 pixels, to eliminate image differences caused by different sizes and scales; 2) color simplification: the scaled-down second image is converted into a 64-level gray image, that is, all the pixels have totally 64 colors; 3) average gray value calculation: an average gray value of all the 64 pixels is calculated; 4) pixel gray comparison: a practical gray of each pixel is compared with the average gray value, is recorded as 1 if being more than or equal to the average gray value, and is recorded as 0 if being less than the average gray value; and 5) hash value calculation: gray comparison results of the pixels are combined to form a 64-bit character string, the character string being the hash value corresponding to the information of the second image, i.e. the first image characteristic of the second image, wherein a combination sequence may be set according to a practical requirement, for example, from left to right and from top to bottom.

The operation that information extraction is performed on the information of the second image to obtain the first characteristic vector corresponding to the information of the second image includes that:

the terminal performs HOG characteristic extraction on the information of the second image to obtain the first characteristic vector corresponding to the information of the second image, specifically including that: 1) gray processing is performed on the second image, and the second image is considered as a three-dimensional image of x, y and z (gray); 2) color-space normalization processing is performed on the second image by adopting a Gamma correction method, so as to regulate a contrast of the second image, reduce influence of local shade and light changes of the second image and simultaneously suppress interference of noise; 3) a gradient, including a size and a direction, of each pixel of the second image is calculated to capture contour information of the second image and simultaneously further weaken interference of light; 4) the second image is divided into small cells, such as 6*6 pixel/cell; 5) statistics about a gradient histogram of each cell is made to form a descriptor of each cell; 6) every n cells form a block, and characteristic descriptors of all the cells in each block are connected in series to obtain a HOG characteristic descriptor of the block, wherein n may be set according to a practical requirement, for example, n is 9, i.e. 3*3 cell/block; and 7) the HOG characteristic descriptors of all the blocks in the second image are connected in series to obtain a HOG characteristic descriptor of the second image, i.e. the first characteristic vector corresponding to the information of the second image.

in step 203, a third image characteristic is obtained on the basis of the first image characteristic and the second image characteristic, and the third image characteristic is determined as a second encryption key.

Here, the operation that the third image characteristic is obtained on the basis of the first image characteristic and the second image characteristic includes that:

the terminal converts the hash value corresponding to the information of the second image into a second characteristic vector, jointing the second characteristic vector and the first characteristic vector together to obtain a comprehensive characteristic vector for identifying the information of the second image, and determines the comprehensive characteristic vector as the third image characteristic.

Here, the operation that the hash value corresponding to the information of the second image is converted into the second characteristic vector includes that:

the terminal represents the hash value corresponding to the information of the second image in a vector form, and determines an obtained vector as the second characteristic vector.

Jointing the second characteristic vector and the first characteristic vector together is to connect a vector tail of the second characteristic vector with a vector header of the first characteristic vector to form the comprehensive characteristic vector. For example, the second characteristic vector is r2={×1, ×2, ×3}, the first characteristic vector is f1={×4, ×5, ×6}, and the comprehensive characteristic vector obtained by jointing the two together is f={×1, ×2, ×3, ×4, ×5, ×6}.

In step 204, similarity matching is performed on the second encryption key and the pre-stored first encryption key to generate a matching result, and the second image is authenticated according to the matching result.

The step specifically includes that: similarity coefficient calculation is performed on the second encryption key and the pre-stored first encryption key to obtain a first coefficient, and the first coefficient is compared with a preset coefficient threshold value; when the first coefficient is larger than the preset coefficient threshold value, it is determined that the second image passes the authentication; and when the first coefficient is smaller than the preset coefficient threshold value, it is determined that the second image fails to pass the authentication.

Here, similarity coefficient calculation may be Pearson correlation coefficient calculation. The first coefficient may be a Pearson correlation coefficient. A magnitude of the coefficient threshold value may be set according to a practical requirement. The coefficient threshold value is preferably 0.8.

The operation that Pearson correlation coefficient calculation is performed on the second encryption key and the pre-stored first encryption key includes that:

it is set that the first encryption key is X and the second encryption key is Y, and a Pearson correlation coefficient $\rho_{X,Y}$ of the second encryption key and the pre-stored first encryption key is obtained according to one of the following formulae:

$$\rho_{X,Y} = \frac{\text{cov}(X, Y)}{\sigma_X \sigma_Y} = \frac{E((X-\mu_X)(Y-\mu_Y))}{\sigma_X \sigma_Y} = \frac{E(XY) - E(X)E(Y)}{\sqrt{E(X^2) - E^2(X)} \sqrt{E(Y^2) - E^2(Y)}}; \quad (1)$$

$$\rho_{X,Y} = \frac{N \sum XY - \sum X \sum Y}{\sqrt{N \sum X^2 - (\sum X)^2} \sqrt{N \sum Y^2 - (\sum Y)^2}}; \text{ and} \quad (2)$$

$$\rho_{X,Y} = \frac{\sum XY - \frac{\sum X \sum Y}{N}}{\sqrt{\left(\sum X^2 - \frac{(\sum X)^2}{N}\right)\left(\sum Y^2 - \frac{(\sum Y)^2}{N}\right)}}, \quad (3)$$

where cov (X,Y) formula (1) represents a covariance of X and Y, $\sigma_X$ represents a standard deviation of X, $\sigma_Y$ represents a standard deviation of Y, E(i) represents an averaging operation over i, $\mu_X$ represents an average value of X and $\mu_Y$ represents an average value of Y; and N in formula (2) and formula (3) represents a vector dimension of X and Y.

Second Embodiment

Figure 4:
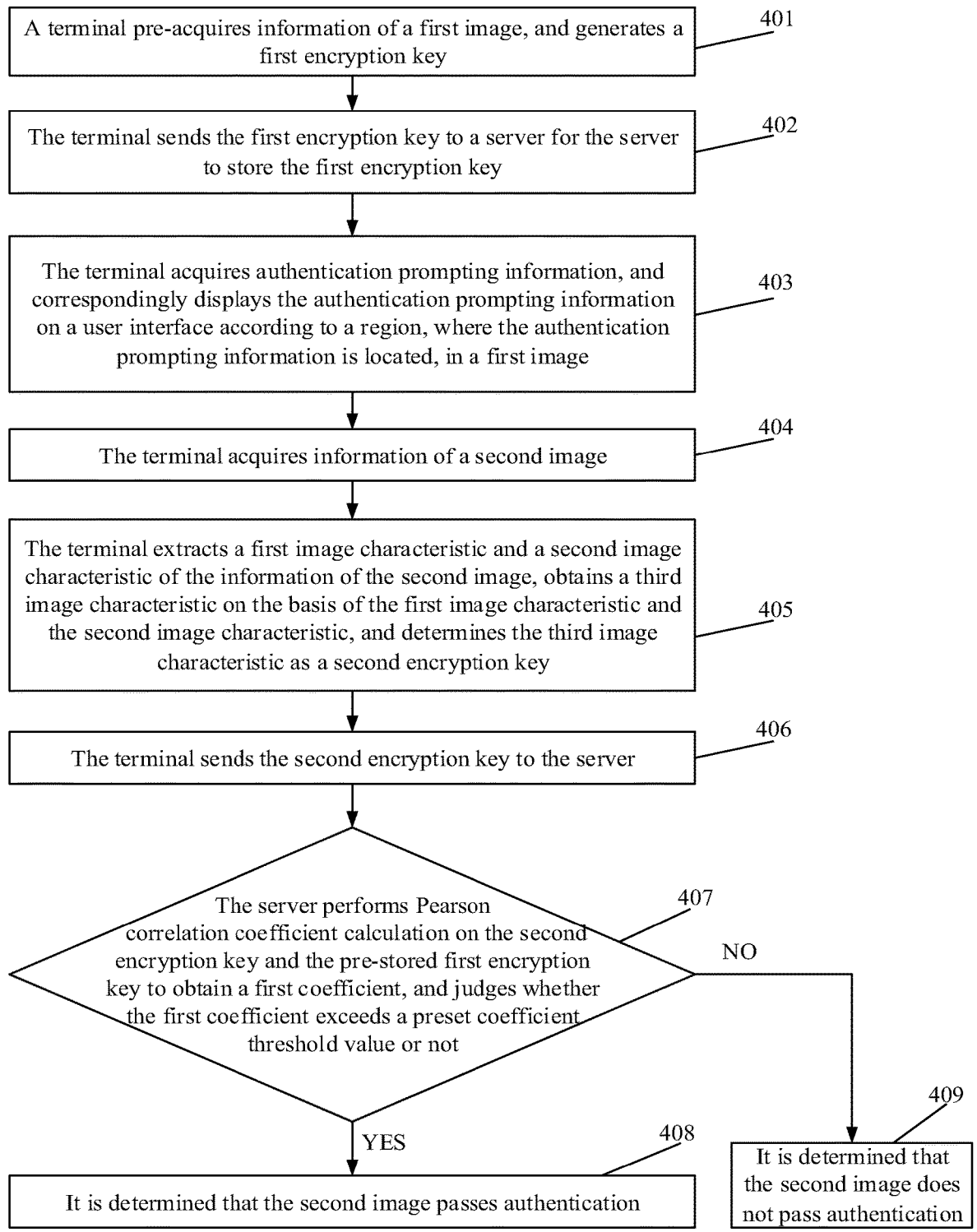
FIG. 4 is an implementation flowchart of a second embodiment of the disclosure.

FIG. 4 shows an information processing method according to an embodiment of the disclosure. As shown in FIG. 4, the information processing method includes the following steps.

In step 401, a terminal pre-acquires information of a first image, and generates a first encryption key.

The step specifically includes that: the terminal acquires first prompting information from the user interface of the terminal, acquires the information of the first image in response to the first prompting information, and generates the first encryption key on the basis of the information of the first image.

Here, the first prompting information may be information for prompting to set an encryption key when a user is registered in and logs in a certain APP or encryption setting prompting information for a local APP function of the terminal.

The information of the first image may be acquired through a camera on the terminal.

The information of the first image may include foreground information and background information. In an example, the foreground information may be a certain facial expression, shot by the camera, of the user, such as crying, smiling and frowning, or any specific target object which is shot, such as a certain family member. Alternatively, the foreground information may be a group photo of the user and the family member or a group photo of the user and another object, such as a cup and a favorite book. Any information, which belongs to the user or is associated with a specific group and specific object in a relationship with the user and may not be known by another user, may be determined as the foreground information.

The operation that the first encryption key is generated on the basis of the information of the first image includes that:

the terminal performs HOG characteristic extraction on the information of the first image to acquire a HOG characteristic vector corresponding to the foreground information in the information of the first image, acquires a perceptual hash value corresponding to the background information in the information of the first image by adopting a PHA, and generates the first encryption key configured to authenticate and identify the information of the first image on the basis of the HOG characteristic vector and the perceptual hash value.

Here, the operation that the first encryption key configured to authenticate and identify the information of the first image is generated on the basis of the HOG characteristic vector and the perceptual hash value includes that:

the terminal converts the perceptual hash value into a corresponding characteristic vector, and joints on the characteristic vector and the HOG characteristic vector together to obtain a characteristic vector configured to identify the information of the first image, i.e. the first encryption key configured to authenticate and identify the information of the first image.

Based on the embodiment of the disclosure, during a practical application, when the terminal acquires the information of the first image, the method may further include that: a parameter regulation prompt configured to regulate image acquisition parameters is generated to make an acquired first image clear and stable. The image acquisition parameters may be light, a focal length and the like.

Based on the embodiment of the disclosure, during the practical application, after the operation that the information of the first image is pre-acquired, the method further includes that:

the terminal synchronizes the acquired information of a first image to a first terminal for the first terminal to store the information of the first image. In such a manner, in an authentication operation of the user, the first terminal may re-synchronize the information of the first image to the terminal as information of a second image, so that a process that the terminal acquires the information of the second image is omitted. Alternatively, the information of the first image stored in the first terminal is directly used for image acquisition of the terminal as the information of the second image. Alternatively, the information of the first image stored in the first terminal is printed/developed into a clear picture as the information of the second image for image acquisition of the terminal, so that a second image is not required to be constructed.

Here, the first terminal is another user terminal different from the terminal, or a desktop computer, a PC, an all-in-one computer and the like.

Based on the embodiment of the disclosure, during the practical application, after the operation that the information of the first image is pre-acquired, the method further includes that:

N pieces of image information within N image regions of the information of the first image are extracted, and the N pieces of image information are determined and stored as authentication prompting information.

Here, N is a positive integer, and a specific numerical value of N may be set according to a practical requirement. For example, the value of N may be 2, 3 or the like.

The N image regions may be N preset fixed image regions. The value of N is 2. Two fixed image regions are a first region in a left upper corner of the first image and a second region in a right lower corner of the first image respectively. Both the first region and the second region are squares with side lengths a. The value of a may be set according to a requirement. Of course, the first region and the second region may also be rectangles or any other shapes of which side lengths are specific values.

Alternatively, the N image regions may also be N image regions, randomly determined by the terminal, in the first image. The shapes, sizes and the like of the N image regions may be the same or different.

The authentication prompting information is configured to prompt the user of a content of the information of the first image in an authentication process. The authentication prompting information may include part of the foreground information and/or part of the background information in the information of the first image.

In step 402, the terminal sends the first encryption key to a server for the server to store the first encryption key.

It is to be noted here that steps 401-402 are only required to be executed when the method of the embodiment of the disclosure is applied for the first time and the first encryption key may be directly applied subsequently.

In step 403, the terminal acquires authentication prompting information, and correspondingly displays the authentication prompting information on a user interface according to a region, where the authentication prompting information is located, in a first image.

Here, the authentication prompting information is displayed on the user interface, so that the user may rapidly memorize the corresponding information of a first image when the first encryption key is set.

In step 404, the terminal acquires information of a second image.

Here, the information of the second image is image information required when the user performs encryption key verification for an operation of unlocking, login or the like. In a practical application process, the second image is a reproduced scenario of the content of the first image. For example, the first image is a V-shaped gesture made by the user at an office table, as shown in FIG. 3, and the second image is a reproduced scenario of the content of the image, that is, the user remakes the V-shaped gesture at the office table.

In step 405, the terminal extracts a first image characteristic and a second image characteristic of the information of the second image, obtains a third image characteristic on the basis of the first image characteristic and the second image characteristic, and determines the third image characteristic as a second encryption key.

Here, the first image characteristic represents the background information of the first image, and the second image characteristic represents the foreground information of the first image.

The step specifically includes that: the terminal acquires a hash value corresponding to the information of the second image, determines the hash value as the first image characteristic, performs information extraction on the information of the second image to obtain a first characteristic vector corresponding to the information of the second image, and determines the first characteristic vector as the second image characteristic.

Here, the operation that the hash value corresponding to the information of the second image is acquired includes that: the terminal acquires a hash value corresponding to the second image by adopting the PHA.

The operation that information extraction is performed on the information of the second image to obtain the first characteristic vector corresponding to the information of the second image includes that:

the terminal performs HOG characteristic extraction on the information of the second image to obtain the first characteristic vector corresponding to the information of the second image.

The operation that the third image characteristic is obtained on the basis of the first image characteristic and the second image characteristic includes that:

the terminal converts the hash value corresponding to the information of the second image into a second characteristic vector, joints the second characteristic vector and the first characteristic vector together to obtain a comprehensive characteristic vector for identifying the information of the second image, and determines the comprehensive characteristic vector as the third image characteristic.

In step 406, the terminal sends the second encryption key to the server.

In step 407, the server performs Pearson correlation coefficient calculation on the second encryption key and the pre-stored first encryption key to obtain a first coefficient, judges whether the first coefficient exceeds a preset coefficient threshold value or not If the first coefficient exceeds a preset coefficient threshold value, step 408 will be performed. If the first coefficient does not exceed a preset coefficient threshold value, step 409 will be performed.

Here, the first coefficient may be a Pearson correlation coefficient.

A magnitude of the coefficient threshold value may be set according to a practical requirement, and the coefficient threshold value is preferably 0.8.

In step 408, it is determined that the second image passes authentication.

In step 409, it is determined that the second image fails to pass authentication.

Third Embodiment

Figure 5:
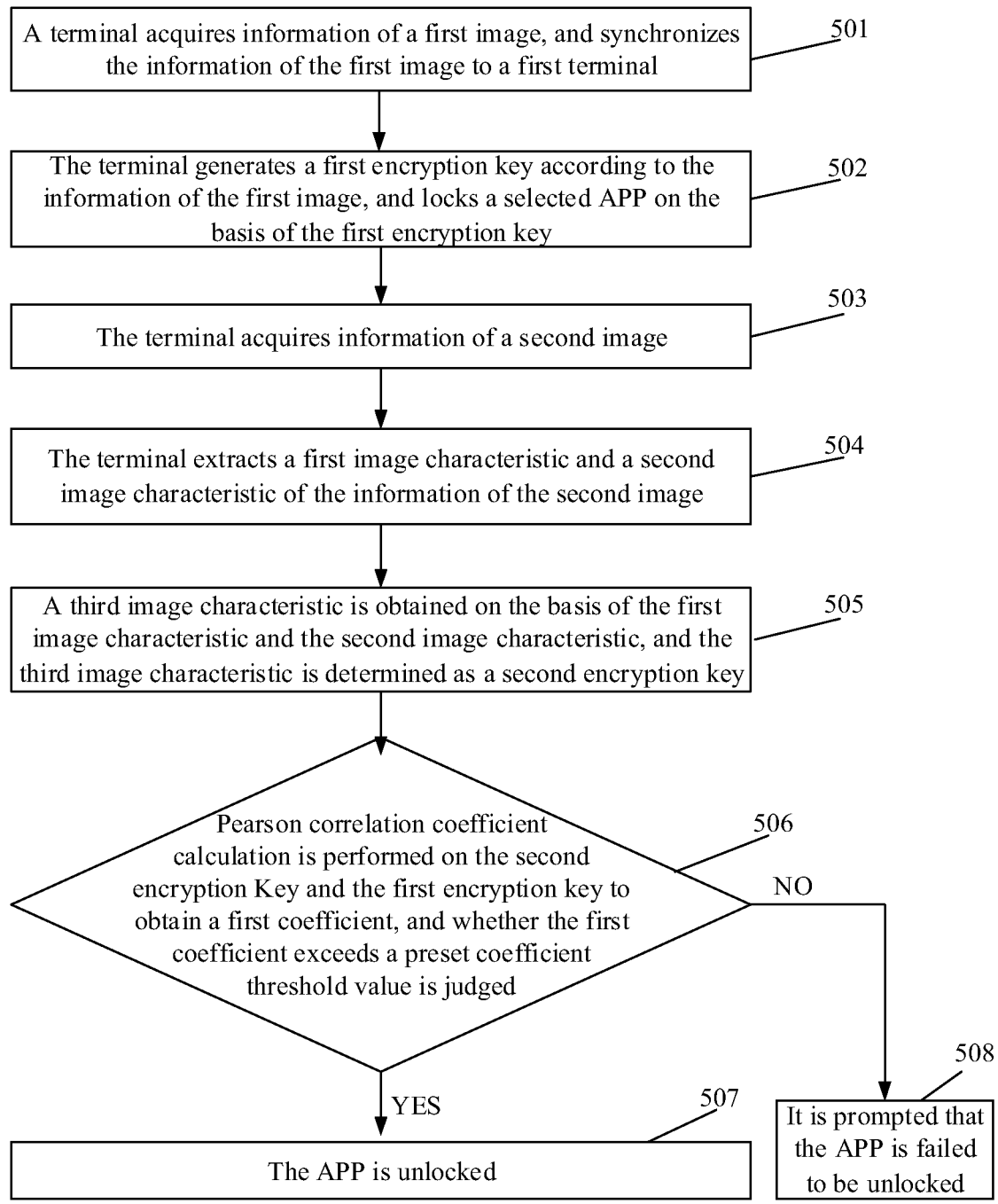
FIG. 5 is an implementation flowchart of a third embodiment of the disclosure.

FIG. 5 shows an information processing method according to an embodiment of the disclosure. The information processing method is applied to an APP, and as shown in FIG. 5, includes the following steps.

In step 501, a terminal acquires information of a first image, and synchronizes the information of the first image to a first terminal.

The step specifically includes that: the terminal acquires first prompting information from the user interface of the terminal, acquires the information of the first image in response to the first prompting information, and generates a first encryption key on the basis of the information of the first image.

In the embodiment of the disclosure, the first prompting information is information for prompting to set an encryption key when a user is registered in an APP locker. Here, the encryption key is an encryption key configured to unlock an APP.

The information of the first image may be acquired through a camera on the terminal.

The information of the first image includes foreground information and background information. In the embodiment of the disclosure, the foreground information is a certain gesture, shot by the camera, of the user, as shown in FIG. 3. Of course, the foreground information may be any target object which is shot, such as a cup.

The terminal synchronizes the acquired information of a first image to the first terminal for the first terminal to store the information of the first image. In such a manner, during an authentication operation of the user, the first terminal may synchronize the information of the first image to the terminal again as information of a second image, so that a process that the terminal acquires the information of the second image is omitted. Alternatively, the information of the first image stored in the first terminal is directly used for image acquisition of the terminal as the information of the second image. Alternatively, the information of the first image stored in the first terminal is printed/developed into a clear picture as the information of the second image for image acquisition of the terminal, so that a second image is not required to be constructed.

Here, the first terminal is another user terminal different from the terminal, or a desktop computer, a PC, an all-in-one computer and the like.

Based on the embodiment of the disclosure, during a practical application, when the terminal acquires the information of the first image, the method may further include that: the terminal generates a parameter regulation prompt configured to regulate image acquisition parameters to make an acquired first image clear and stable. The image acquisition parameters may be light, a focal length and the like.

Based on the embodiment of the disclosure, during the practical application, after the operation that the information of the first image is acquired, the method further includes that:

the terminal extracts N pieces of image information within N image regions of the information of the first image, and determines and stores the N pieces of image information as authentication prompting information.

Here, N is a positive integer, and a specific numerical value of N may be set according to a practical requirement. For example, the value of N may be 2, 3 or the like.

The N image regions may be N preset fixed image regions. In the embodiment of the disclosure, the N image regions are fixed to be a first region in a left upper corner of the first image and a second region in a right lower corner of the first image respectively. Both the first region and the second region are squares with side lengths a. The value of a may be set according to a requirement. Of course, the first region and the second region may also be rectangles or any other shapes of which side lengths are specific values.

Alternatively, the N image regions may also be N image regions, randomly determined by the terminal, in the first image. The shapes, sizes and the like of the N image regions may be the same or different.

The authentication prompting information is configured to prompt the user of a content of the information of the first image in an authentication process. The authentication prompting information may include part of the foreground information and/or part of the background information in the information of the first image.

In step 502, the terminal generates a first encryption key according to the information of the first image, and locks a selected APP on the basis of the first encryption key.

The step specifically includes that: the terminal performs HOG characteristic extraction on the information of the first image to acquire a HOG characteristic vector corresponding to the foreground information in the information of the first image, acquires a perceptual hash value corresponding to the background information in the information of the first image by adopting a PHA, and generates the first encryption key configured to authenticate and identify the information of the first image on the basis of the HOG characteristic vector and the perceptual hash value.

Here, the operation that the first encryption key configured to authenticate and identify the information of the first image is generated on the basis of the HOG characteristic vector and the perceptual hash value includes that:

the terminal converts the perceptual hash value into a corresponding characteristic vector, and joints the characteristic vector and the HOG characteristic vector together to obtain a characteristic vector configured to identify the information of the first image, i.e. the first encryption key configured to authenticate and identify the information of the first image.

It is to be noted that generation of the first encryption key is only required to be executed when the method of the embodiment of the disclosure is applied for the first time and the first encryption key may be directly applied subsequently to lock the APP.

In step 503, the terminal acquires information of a second image.

Before the step, the method further includes that: the terminal acquires the authentication prompting information, and correspondingly displays the authentication prompting information on the user interface of the terminal according to a region, where the authentication prompting information is located, in the first image. Therefore, the user may rapidly remember the corresponding information of a first image when the first encryption key is set.

Here, the operation that the authentication prompting information is acquired includes that: the terminal acquires the authentication prompting information locally stored in the terminal.

The information of the second image is image information required when the user performs encryption key verification for APP unlocking.

The step specifically includes that: the terminal acquires the information of the second image displayed on a display screen of the first terminal. Here, the information of the second image is actually the information of the first image stored in the first terminal. In a practical operation process, the first terminal may be held by the user, and the first terminal displays the information of the first image for image acquisition of the terminal.

Alternatively, the terminal acquires the information of the first image sent by the first terminal, and determines the information of the first image as the information of the second image.

Alternatively, the user reproduces a scenario of a content of the first image, and the terminal acquires reproduced scenario information as the information of the second image.

In step 504, the terminal extracts a first image characteristic and a second image characteristic of the information of the second image.

Here, the first image characteristic represents the background information of the first image, and the second image characteristic represents the foreground information of the first image.

The step specifically includes that: the terminal acquires a hash value corresponding to the information of the second image, determines the hash value as the first image characteristic, performs information extraction on the information of the second image to obtain a first characteristic vector corresponding to the information of the second image, and determines the first characteristic vector as the second image characteristic.

Here, the operation that the hash value corresponding to the information of the second image is acquired includes that: the terminal acquires a hash value corresponding to the second image by adopting the PHA.

The operation that information extraction is performed on the information of the second image to obtain the first characteristic vector corresponding to the information of the second image includes that:

the terminal performs HOG characteristic extraction on the information of the second image to obtain the first characteristic vector corresponding to the information of the second image.

In step 505, the terminal obtains a third image characteristic on the basis of the first image characteristic and the second image characteristic, and determines the third image characteristic as a second encryption key.

Here, the operation that the third image characteristic is obtained on the basis of the first image characteristic and the second image characteristic includes that:

the terminal converts the hash value corresponding to the information of the second image into a second characteristic vector, joints the second characteristic vector and the first characteristic vector together to obtain a comprehensive characteristic vector for identifying the information of the second image, and determines the comprehensive characteristic vector as the third image characteristic.

Here, the operation that the hash value corresponding to the information of the second image is converted into the second characteristic vector includes that:

the terminal represents the hash value corresponding to the information of the second image in a vector form, and determines an obtained vector as the second characteristic vector.

Jointing the second characteristic vector and the first characteristic vector together is to connect a vector tail of the second characteristic vector with a vector header of the first characteristic vector to form the comprehensive characteristic vector.

In step 506, the terminal performs Pearson correlation coefficient calculation on the second encryption key and the first encryption key to obtain a first coefficient, judges whether the first coefficient exceeds a preset coefficient threshold value or not. If the first coefficient exceeds a preset coefficient threshold value, step 507 will be performed. If the first coefficient do not exceed a preset coefficient threshold value, step 508 will be performed.

Here, the first coefficient may be a Pearson correlation coefficient.

A magnitude of the coefficient threshold value may be set according to a practical requirement, and in the embodiment of the disclosure, the coefficient threshold value is 0.8.

In step 507, the APP is unlocked.

In step 508, it is prompted that the APP is failed to be unlocked.

Fourth Embodiment

Figure 6:
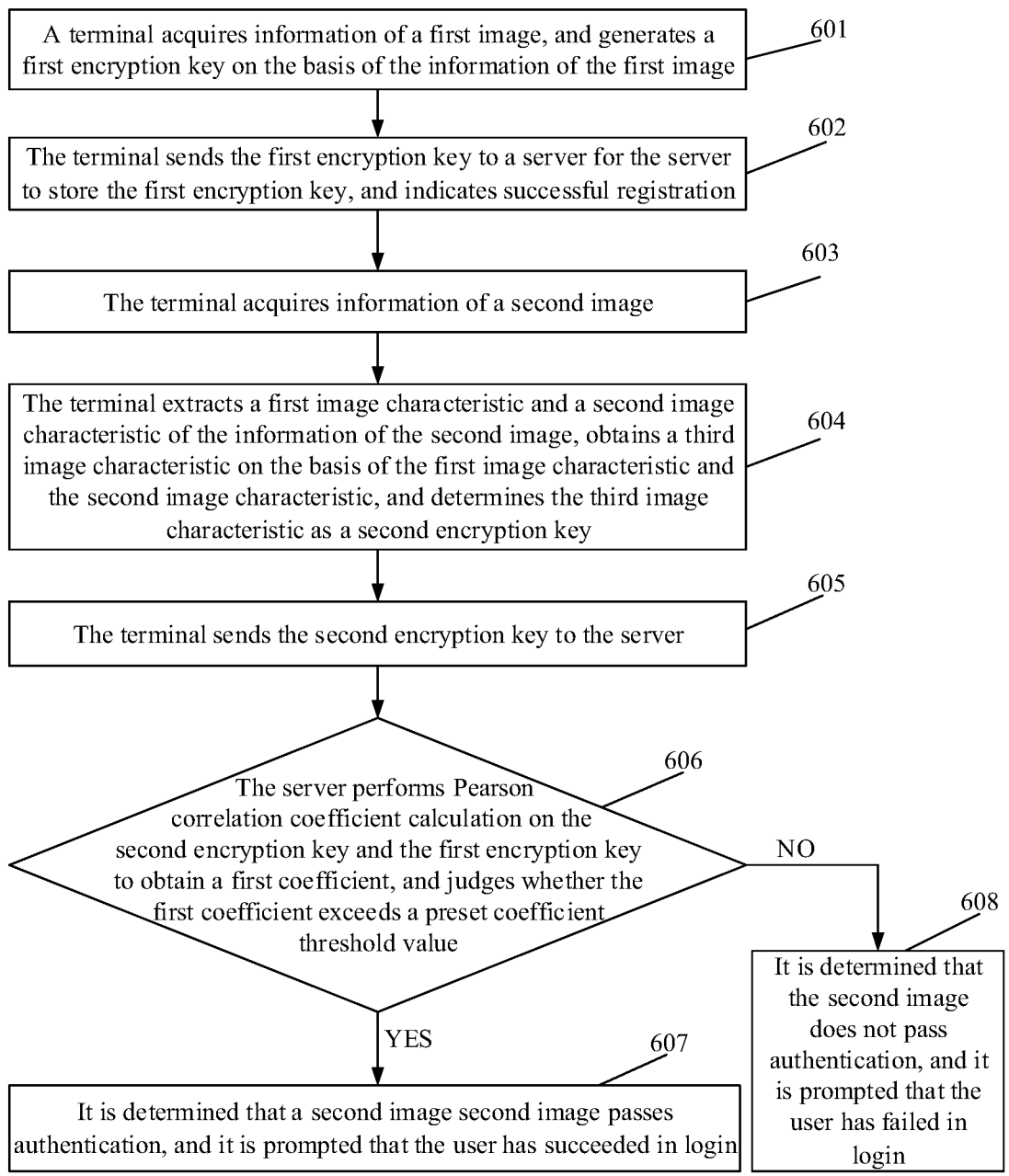
FIG. 6 is an implementation flowchart of a fourth embodiment of the disclosure.

FIG. 6 shows an information processing method according to an embodiment of the disclosure. The information processing method is applied to login authentication of chatting software such as QQ and WeChat. As shown in FIG. 6, the method includes the following steps.

In step 601, a terminal acquires information of a first image, and generates a first encryption key on the basis of the information of the first image.

The step specifically includes that: the terminal acquires first prompting information from the user interface of the terminal, acquires the information of the first image in response to the first prompting information, and generates the first encryption key on the basis of the information of the first image.

In the embodiment of the disclosure, the first prompting information is information for prompting to set an encryption key when a user is registered in the chatting software such as QQ and WeChat, and the first encryption key is an encryption key used when the user logs in the chatting software such as QQ and WeChat again.

The information of the first image may be acquired through a camera on the terminal.

The information of the first image includes foreground information and background information. In the embodiment of the disclosure, the foreground information is a certain gesture, shot by the camera, of the user, as shown in FIG. 3. Of course, the foreground information may be any target object which is shot, such as a cup.

Based on the embodiment of the disclosure, during a practical application, after the terminal acquires the information of the first image, the method further includes that:

the terminal synchronizes the acquired information of a first image to a first terminal for the first terminal to store the information of the first image. In such a manner, during an authentication operation of the user, the first terminal may re-synchronize the information of the first image to the terminal as information of a second image, so that a process that the terminal acquires the information of the second image is omitted. Alternatively, the information of the first image stored in the first terminal is directly used for image acquisition of the terminal as the information of the second image. Alternatively, the information of the first image stored in the first terminal is printed/developed into a clear picture as the information of the second image for image acquisition of the terminal, so that a second image is not required to be constructed.

Here, the first terminal is another user terminal different from the terminal, or a desktop computer, a PC, an all-in-one computer and the like.

Based on the embodiment of the disclosure, during the practical application, when the terminal acquires the information of the first image, the method may further include that: the terminal generates a parameter regulation prompt configured to regulate image acquisition parameters to make an acquired first image clear and stable. The image acquisition parameters may be light, a focal length and the like.

Based on the embodiment of the disclosure, during the practical application, after the operation that the information of the first image is acquired, the method further includes that:

the terminal extracts N pieces of image information within N image regions of the information of the first image, and determines and stores the N pieces of image information as authentication prompting information.

Here, N is a positive integer, and a specific numerical value of N may be set according to a practical requirement. For example, the value of N may be 2, 3 or the like.

The N image regions may be N preset fixed image regions. For example, the N image regions are fixed to be a first region in a left upper corner of the first image and a second region in a right lower corner of the first image respectively. Both the first region and the second region are squares with side lengths a. The value of a may be set according to a requirement. Of course, the first region and the second region may also be rectangles or any other shapes of which side lengths are specific values.

Alternatively, the N image regions may also be N image regions, randomly determined by the terminal, in the first image. The shapes, sizes and the like of the N image regions may be the same or different. In the embodiment of the disclosure, the N image regions are two image regions, which are randomly determined by the terminal and have the same area, in the first image.

The authentication prompting information is configured to prompt the user of a content of the information of the first image in a login authentication process. The authentication prompting information may include part of the foreground information and/or part of the background information in the information of the first image.

Based on the embodiment of the disclosure, during the practical application, the operation that the first encryption key is generated on the basis of the information of the first image includes that:

the terminal performs HOG characteristic extraction on the information of the first image to acquire a HOG characteristic vector corresponding to the foreground information in the information of the first image, acquires a perceptual hash value corresponding to the background information in the information of the first image by adopting a PHA, and generates the first encryption key configured to authenticate and identify the information of the first image on the basis of the HOG characteristic vector and the perceptual hash value.

Here, the operation that the first encryption key configured to authenticate and identify the information of the first image is generated on the basis of the HOG characteristic vector and the perceptual hash value includes that:

the terminal converts the perceptual hash value into a corresponding characteristic vector, and joints the characteristic vector and the HOG characteristic vector together to obtain a characteristic vector configured to identify the information of the first image, i.e. the first encryption key configured to authenticate and identify the information of the first image.

In step 602, the terminal sends the first encryption key to a server for the server to store the first encryption key, and prompts successful registration.

It is to be noted that Steps 601-602 are only required to be executed when the method of the embodiment of the disclosure is applied for the first time and the first encryption key may be directly applied subsequently.

In step 603, the terminal acquires information of a second image.

Before the step, the method further includes that: the terminal acquires the authentication prompting information, and correspondingly displays the authentication prompting information on the user interface of the terminal according to a region, where the authentication prompting information is located, in the first image.

Here, the authentication prompting information is displayed on the user interface, so that the user may rapidly remember the corresponding information of a first image when the first encryption key is set.

In the embodiment of the disclosure, the second image is a reproduced scenario of the content of the first image. For example, the first image is a V-shaped gesture made by the user at an office table, as shown in FIG. 3, and the second image is a reproduced scenario of the content of the image, that is, the user remakes the V-shaped gesture at the office table.

In step 604, the terminal extracts a first image characteristic and a second image characteristic of the information of the second image, obtains a third image characteristic on the basis of the first image characteristic and the second image characteristic, and determines the third image characteristic as a second encryption key.

Here, the first image characteristic represents the background information of the first image, and the second image characteristic represents the foreground information of the first image.

The step specifically includes that: the terminal acquires a hash value corresponding to the information of the second image, determines the hash value as the first image characteristic, performs information extraction on the information of the second image to obtain a first characteristic vector corresponding to the information of the second image, and determines the first characteristic vector as the second image characteristic.

Here, the operation that the hash value corresponding to the information of the second image is acquired includes that: the terminal acquires a hash value corresponding to the second image by adopting the PHA.

The operation that information extraction is performed on the information of the second image to obtain the first characteristic vector corresponding to the information of the second image includes that:

the terminal performs HOG characteristic extraction on the information of the second image to obtain the first characteristic vector corresponding to the information of the second image.

The operation that the third image characteristic is obtained on the basis of the first image characteristic and the second image characteristic includes that:

the terminal converts the hash value corresponding to the information of the second image into a second characteristic vector, joints the second characteristic vector and the first characteristic vector together to obtain a comprehensive characteristic vector for identifying the information of the second image, and determines the comprehensive characteristic vector as the third image characteristic.

In step 605, the terminal sends the second encryption key to the server.

In step 606, the server performs Pearson correlation coefficient calculation on the second encryption key and the first encryption key to obtain a first coefficient, judges whether the first coefficient exceeds a preset coefficient threshold value or not. If the first coefficient exceeds a preset coefficient threshold value, step 607 will be performed. If the first coefficient does not exceed a preset coefficient threshold value, step 608 will be performed.

Here, the first coefficient may be a Pearson correlation coefficient.

A magnitude of the coefficient threshold value may be set according to a practical requirement, and the coefficient threshold value is preferably 0.8.

In step 607, it is determined that a second image passes authentication, and a user is prompted to succeed in login.

In step 608, it is determined that the second image fails to pass authentication, and the user is prompted to fail in login.

Fifth Embodiment

Figure 7:
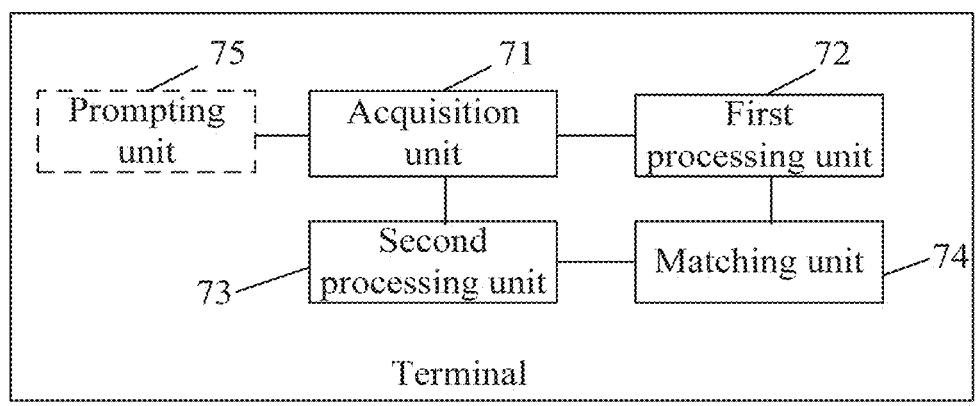
FIG. 7 is a structure diagram of a fifth embodiment of the disclosure.

FIG. 7 is a structure diagram of terminal the first embodiment of the disclosure. As shown in FIG. 7, a terminal of the embodiment of the disclosure includes: an acquisition unit 71, a first processing unit 72, a second processing unit 73 and a matching unit 74.

The acquisition unit 71 is configured to pre-acquire information of a first image, and acquire information of a second image.

The first processing unit 72 is configured to generate and store a first encryption key on the basis of the information of the first image.

The second processing unit 73 is configured to extract a first image characteristic and a second image characteristic of the information of the second image, obtain a third image characteristic on the basis of the first image characteristic and the second image characteristic, and determine the third image characteristic as a second encryption key, wherein the first image characteristic represents background information of the first image, and the second image characteristic represents foreground information of the first image.

The matching unit 74 is configured to perform similarity matching on the second encryption key and the pre-stored first encryption key to generate a matching result, and authenticate a second image according to the matching result.

Based on the embodiment of the disclosure, during a practical application, the acquisition unit 71 is specifically configured to acquire first prompting information of a user interface of the terminal, and acquire the information of the first image in response to the first prompting information.

Here, the first prompting information may be information for prompting to set an encryption key when a user is registered in and logs in a certain APP or encryption setting prompting information for a local APP function of the terminal.

The information of the first image may include foreground information and background information. The foreground information may be a certain gesture, shot by a camera, of the user, as shown in FIG. 3, or any target object which is shot, such as a cup.

Based on the embodiment of the disclosure, during the practical application, the first processing unit 72 is specifically configured to perform HOG characteristic extraction on the information of the first image to acquire a HOG characteristic vector corresponding to the foreground information in the information of the first image, acquire a perceptual hash value corresponding to the background information in the information of the first image by adopting a PHA, and generate the first encryption key configured to authenticate and identify the information of the first image on the basis of the HOG characteristic vector and the perceptual hash value.

Based on the embodiment of the disclosure, during the practical application, the terminal further includes a prompting unit 75, configured to generate a parameter regulation prompt configured to regulate image acquisition parameters to make an acquired first image clear and stable. The image acquisition parameters may be light, a focal length and the like.

Based on the embodiment of the disclosure, during the practical application, the first processing unit 72 is further configured to synchronize the acquired information of a first image to a first terminal for the first terminal to store the information of the first image.

Based on the embodiment of the disclosure, during the practical application, the first processing unit 72 is further configured to extract N pieces of image information within N image regions of the information of the first image, and determine and store the N pieces of image information as authentication prompting information. N is a positive integer, and a specific numerical value of N may be set according to a practical requirement. For example, the value of N may be 2, 3 or the like.

The N image regions may be N preset fixed image regions. The value of N is 2. Two fixed image regions are a first region in a left upper corner of the first image and a second region in a right lower corner of the first image respectively. Both the first region and the second region are squares with side lengths a. The value of a may be set according to a requirement. Of course, the first region and the second region may also be rectangles or any other shapes of which side lengths are specific values.

Alternatively, the N image regions may also be N image regions, randomly determined by the terminal, in the first image. The shapes, sizes and the like of the N image regions may be the same or different.

The authentication prompting information is configured to prompt the user of a content of the information of the first image in an authentication process. The authentication prompting information may include part of the foreground information and/or part of the background information in the information of the first image.

Based on the embodiment of the disclosure, during the practical application, the first processing unit 72 is further configured to acquire the authentication prompting information, and correspondingly display the authentication prompting information on the user interface of the terminal according to a region, where the authentication prompting information is located, in the first image.

Based on the embodiment of the disclosure, during the practical application, the second processing unit 73 is specifically configured to acquire a hash value corresponding to the information of the second image, and determine the hash value as the first image characteristic.

The second processing unit 73 is further configured to perform information extraction on the information of the second image to obtain a first characteristic vector corresponding to the information of the second image, and determine the first characteristic vector as the second image characteristic.

Based on the embodiment of the disclosure, during the practical application, the second processing unit 73 is specifically configured to convert the hash value into a second characteristic vector, joint the second characteristic vector and the first characteristic vector together to obtain a comprehensive characteristic vector for identifying the information of the second image, and determine the comprehensive characteristic vector as the third image characteristic.

Based on the embodiment of the disclosure, during the practical application, the matching unit 74 is specifically configured to perform similarity coefficient calculation on the second encryption key and the pre-stored first encryption key to obtain a first coefficient, and compare the first coefficient with a preset coefficient threshold value;

when the first coefficient is larger than the preset coefficient threshold value, determine that the second image passes authentication; and when the first coefficient is smaller than the preset coefficient threshold value, determine that the second image fails to pass authentication, wherein similarity coefficient calculation may be Pearson correlation coefficient calculation, the first coefficient may be a Pearson correlation coefficient, a magnitude of the coefficient threshold value may be set according to a practical requirement, and the coefficient threshold value is preferably 0.8.

It is to be noted here that the terminal may be a PC, a notebook computer, a desktop computer, an all-in-one computer, and the terminal which combines each unit for realization of functions of each unit or of which the functions of each unit are split at least includes a database configured to store data and a processor configured for data processing, or includes a storage medium arranged in the terminal or an independent storage medium.

Here, the processor configured for data processing may be implemented by a microprocessor, a Central Processing Unit (CPU), a Digital Signal Processor (DSP) or a Field-Programmable Gate Array (FPGA) when executing processing; and the storage medium includes an operation instruction, the operation instruction may be a computer-executable code, and each step in the flow of the information processing method of the embodiment of the disclosure is implemented through the operation instruction.

Figure 8:
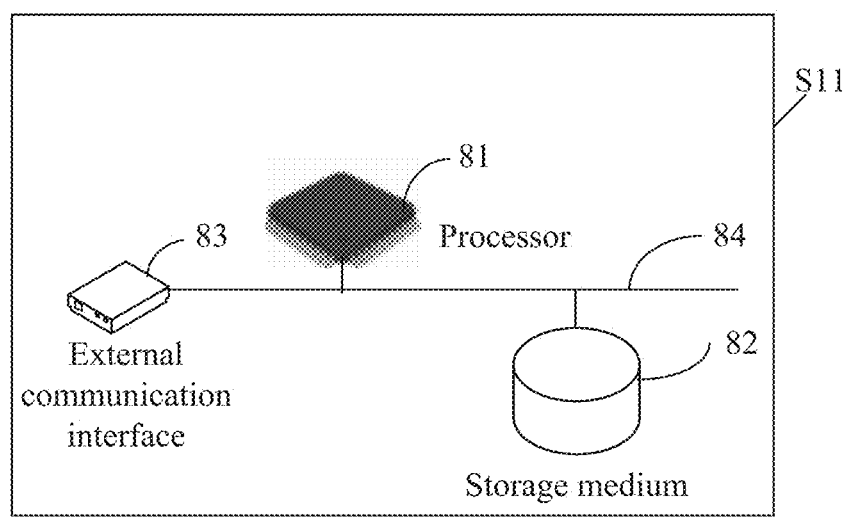
FIG. 8 is a diagram of a hardware entity of a terminal according to an embodiment of the disclosure.

An example of the terminal of the embodiment of the disclosure serving as a hardware entity S11 is shown in FIG. 8. The terminal includes a processor 81, a storage medium 82 and at least one external communication interface 83. The processor 81, the storage medium 82 and the external communication interface 83 are all connected through a bus 84.

It is important to point out here that: the above descriptions about the terminal are similar to the descriptions about the method, and descriptions about beneficial effects the same as those of the method will not be elaborated. Technical details undisclosed in the terminal embodiment of the disclosure refer to descriptions in the abovementioned embodiments of the disclosure.

Sixth Embodiment

Figure 9:
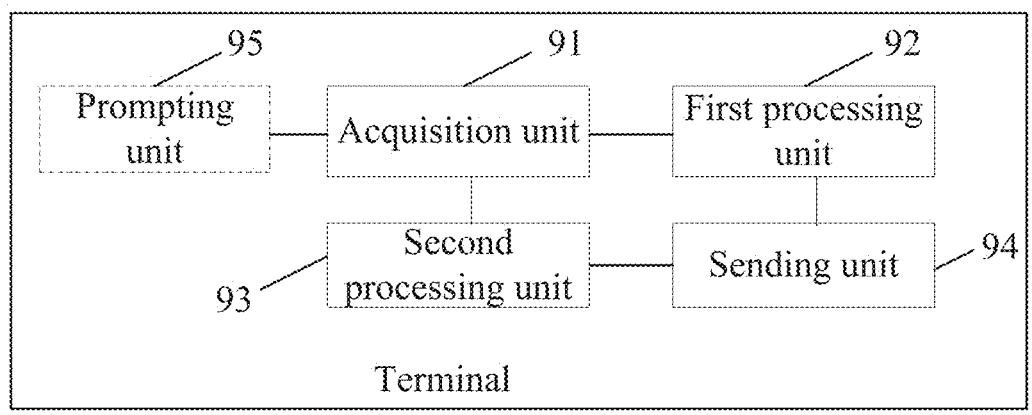
FIG. 9 is a structure diagram of the sixth embodiment of the disclosure.

FIG. 9 is a structure diagram of terminal the sixth embodiment of the disclosure. As shown in FIG. 9, a terminal of the embodiment of the disclosure includes: an acquisition unit 91, a first processing unit 92, a second processing unit 93 and a sending unit 94.

The acquisition unit 91 is configured to pre-acquire information of a first image and acquire information of a second image.

The first processing unit 92 is configured to generate a first encryption key on the basis of the information of the first image.

The second processing unit 93 is configured to extract a first image characteristic and a second image characteristic of the information of the second image, obtain a third image characteristic on the basis of the first image characteristic and the second image characteristic, and determine the third image characteristic as a second encryption key, wherein the first image characteristic represents background information of the first image, and the second image characteristic represents foreground information of the first image.

The sending unit 94 is configured to send the first encryption key and the second encryption key to a server for the server to perform similarity matching on the second encryption key to generate a matching result and the first encryption key and authenticate a second image according to the matching result.

Based on the embodiment of the disclosure, during a practical application, the acquisition unit 91 is specifically configured to acquire first prompting information of a user interface of the terminal, acquire the information of the first image in response to the first prompting information, and generate the first encryption key on the basis of the information of the first image.

Here, the first prompting information may be information for prompting to set an encryption key when a user is registered in and logs in a certain APP or encryption setting prompting information for a local APP function of the terminal.

The information of the first image may include foreground information and background information, wherein the foreground information may be a certain gesture, shot by a camera, of the user, as shown in FIG. 3, or any target object which is shot, such as a cup.

Based on the embodiment of the disclosure, during the practical application, the first processing unit 92 is specifically configured to perform HOG characteristic extraction on the information of the first image to acquire a HOG characteristic vector corresponding to the foreground information in the information of the first image, acquire a perceptual hash value corresponding to the background information in the information of the first image by adopting a PHA, and generate the first encryption key configured to authenticate and identify the information of the first image on the basis of the HOG characteristic vector and the perceptual hash value.

Based on the embodiment of the disclosure, during the practical application, the terminal further includes a prompting unit 95, configured to generate a parameter regulation prompt configured to regulate image acquisition parameters to make an acquired first image clear and stable. The image acquisition parameters may be light, a focal length and the like.

Based on the embodiment of the disclosure, during the practical application, the first processing unit 92 is further configured to synchronize the acquired information of a first image to a first terminal for the first terminal to store the information of the first image.

Based on the embodiment of the disclosure, during the practical application, the first processing unit 92 is further configured to extract N pieces of image information within N image regions of the information of the first image, and determine and store the N pieces of image information as authentication prompting information. N is a positive integer, and a specific numerical value of N may be set according to a practical requirement. For example, the value of N may be 2, 3 or the like.

The N image regions may be N preset fixed image regions. The value of N is 2. Two fixed image regions are a first region in a left upper corner of the first image and a second region in a right lower corner of the first image respectively. Both the first region and the second region are squares with side lengths a. The value of a may be set according to a requirement. Of course, the first region and the second region may also be rectangles or any other shapes of which side lengths are specific values.

Alternatively, the N image regions may also be N image regions, randomly determined by the terminal, in the first image. The shapes, sizes and the like of the N image regions may be the same or different.

The authentication prompting information is configured to prompt the user of a content of the information of the first image in an authentication process. The authentication prompting information may include part of the foreground information and/or part of the background information in the information of the first image.

Based on the embodiment of the disclosure, during the practical application, the first processing unit 92 is further configured to acquire the authentication prompting information, and correspondingly display the authentication prompting information on the user interface of the terminal according to a region, where the authentication prompting information is located, in the first image.

Based on the embodiment of the disclosure, during the practical application, the second processing unit 93 is specifically configured to acquire a hash value corresponding to the information of the second image, and determine the hash value as the first image characteristic.

The second processing unit 93 is further configured to perform information extraction on the information of the second image to obtain a first characteristic vector corresponding to the information of the second image, and determine the first characteristic vector as the second image characteristic.

Based on the embodiment of the disclosure, during the practical application, the second processing unit 93 is specifically configured to convert the hash value into a second characteristic vector, joint the second characteristic vector and the first characteristic vector together to obtain a comprehensive characteristic vector for identifying the information of the second image, and determine the comprehensive characteristic vector as the third image characteristic.

Correspondingly, the embodiment of the disclosure further provides a computer storage medium, in which a computer-executable instruction is stored, the computer-executable instruction being configured to execute the abovementioned information processing method.

In some embodiments provided by the disclosure, it should be understood that the disclosed equipment and method may be implemented in another manner. The equipment embodiment described above is only schematic, and for example, division of the units is only logic function division, and other division manners may be adopted during practical implementation. For example, multiple units or components may be combined or integrated into another system, or some characteristics may be neglected or not executed. In addition, coupling, or direct coupling or communication connection between each displayed or discussed component may be indirect coupling or communication connection, implemented through some interfaces, of the equipment or the units, and may be electrical and mechanical or adopt other forms.

The abovementioned units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit. The abovementioned integrated unit may be implemented in a hardware form, and may also be implemented in form of hardware and software function unit.

Those skilled in the art should know that: all or part of the steps of the abovementioned embodiment may be implemented by instructing related hardware through a program, the abovementioned program may be stored in a computer-readable storage medium, and the program is executed to execute the steps of the abovementioned embodiment; and the storage medium includes: various media capable of storing program codes such as mobile storage equipment, a Read-Only Memory (ROM), a Random Access Memory (RAM), a magnetic disk or an optical disk.

Alternatively, when being implemented in form of software function module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a piece of computer equipment (which may be a PC, a server, network equipment or the like) to execute all or part of the method in each embodiment of the disclosure. The abovementioned storage medium includes: various media capable of storing program codes such as mobile storage equipment, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

INDUSTRIAL APPLICABILITY

According to the embodiments of the disclosure, the information of the first image is pre-acquired, and the first encryption key is generated and stored; during authentication, the information of the second image is acquired, and the first image characteristic and the second image characteristic of the information of the second image are extracted, wherein the first image characteristic represents the background information of the first image, and the second image characteristic represents the foreground information of the first image; the third image characteristic is obtained on the basis of the first image characteristic and the second image characteristic, and the third image characteristic is determined as the second encryption key; and similarity matching is performed on the second encryption key and the pre-stored first encryption key, and the second image is authenticated according to the matching result. In such a manner, the first encryption key is generated by the information of the first image, so that the user may conveniently and accurately memorize an image password, and user experiences are improved; and during authentication, the image information is acquired again, and authentication through the encryption key generated by the acquired image information may enhance password checking security.

The invention claimed is:

1. An information processing method, executed by one or more processors, comprising:
    obtaining, by an application server terminal, a first image from a user terminal;
    generating and storing a first encryption key based on the first image to form a pre-stored first encryption key;
    in response to an authentication request, presenting, on a screen of the user terminal, a portion but not entirety of the first image as authentication prompting information;
    sending to the application server terminal, by the user terminal, a second image, the second image being a copy of the first image;
    extracting a first image characteristic and second image characteristic from the second image, wherein the first image characteristic represents background information of the first image, and the second image characteristic represents foreground information of the first image, the foreground information represents information of one or more objects in the first image which are acquired as a category of main objects during obtaining of the first image, and the background information represents information of the remaining portions of the first image excluding the category of the main objects;
    obtaining a third image characteristic based on the first image characteristic and the second image characteristic, and determining the third image characteristic as a second encryption key;
    performing similarity matching on the second encryption key and the pre-stored first encryption key to generate a matching result; and
    authenticating the second image according to the matching result.

2. The method according to claim 1, wherein obtaining the first image comprises:
    acquiring first prompting information to prompt a user of the user terminal to set up the first encryption key via a user interface of the user terminal;
    acquiring the first image in response to the first prompting information; and
    generating the first encryption key based on the first image.

3. The method according to claim 2, further comprising:
    obtaining N image regions of the first image; and
    storing, by the application server terminal, the N image regions as the authentication prompting information, N being a positive integer of equal to or greater than 2, wherein the authentication prompting information is to prompt the user to provide the second image.

4. The method according to claim 3, when the N image regions include first and second image regions, the first image region being separate from and spaced apart from the second image region, the first image region including a portion of the background information of the first image and the second image region including a portion of the foreground information of the first image.

5. The method according to claim 3, wherein the N image regions include first and second image regions, the first image region being positioned at an upper left portion of the first image, and the second image region being positioned at a lower right portion of the first image.

6. The method according to claim 1, wherein extracting the first image characteristic and the second image characteristic from the second image comprises:
    acquiring a hash value corresponding to the second image, and determining the hash value as the first image characteristic;
    performing information extraction on the second image to obtain a first characteristic vector corresponding to the second image; and
    determining the first characteristic vector as the second image characteristic.

7. The method according to claim 6, wherein obtaining the third image characteristic based on the first image characteristic and the second image characteristic comprises:
    converting the hash value into a second characteristic vector, jointing the second characteristic vector and the first characteristic vector together to obtain a comprehensive characteristic vector for identifying the second image, and determining the comprehensive characteristic vector as the third image characteristic.

8. The method according to claim 7, wherein jointing the second characteristic vector and the first characteristic vector together comprises:
    connecting a tail of the second characteristic vector with a head of the first characteristic vector, or connecting a tail of the first characteristic vector with a head of the second characteristic vector.

9. The method according to claim 1, wherein performing similarity matching on the second encryption key and the pre-stored first encryption key and authenticating the second image according to the matching result comprises:
performing similarity coefficient calculation on the second encryption key and the pre-stored first encryption key to obtain a first coefficient, and comparing the first coefficient with a preset coefficient threshold value;
when the first coefficient is larger than the preset coefficient threshold value, determining that the second image passes authentication; and
when the first coefficient is smaller than the preset coefficient threshold value, determining that the second image fails to pass authentication.

10. The method according to claim 1, wherein the foreground information of the first image includes a photo of a family member or a friend of the user during acquisition of the first image.

11. An application server terminal, comprising:
a memory; and
a processor coupled to the memory, the processor being configured to:
obtain a first image from a user terminal;
generate and store a first encryption key based on the first image to form a pre-stored first encryption key;
in response to an authentication request, facilitate presentation on a screen of the user terminal a portion but not entirety of the first image as authentication prompting information;
receive from the user terminal a second image, the second image being a copy of the first image;
extract a first image characteristic and a second image characteristic from the second image, obtain a third image characteristic based on the first image characteristic and the second image characteristic, and determine the third image characteristic as a second encryption key, wherein the first image characteristic represents background information of the first image, and the second image characteristic represents foreground information of the first image, the foreground information represents information of one or more objects in the first image which are acquired as a category of main objects during obtaining of the first image, and the background information represents information of the remaining portions of the first image excluding the category of the main objects;
perform similarity matching on the second encryption key and the pre-stored first encryption key to generate a matching result; and
authenticate a second image according to the matching result.

12. The application server terminal according to claim 11, wherein the processor is further configured to:
acquire first prompting information to prompt a user of the user terminal to set up the first encryption key via a user interface of the user terminal; and
acquire the first image in response to the first prompting information.

13. The application server terminal according to claim 12, wherein the processor is further configured to:
obtain N image regions of the first image; and
store the N image regions as the authentication prompting information, N being a positive integer of equal to or greater than 2.

14. The application server terminal according to claim 11, wherein the processor is further configured to:

acquire a hash value corresponding to the second image, and determine the hash value as the first image characteristic;
perform information extraction on the second image to obtain a first characteristic vector corresponding to the second image; and
determine the first characteristic vector as the second image characteristic.

15. The application server terminal according to claim 14, wherein the processor is further configured to:
convert the hash value into a second characteristic vector, joint the second characteristic vector and the first characteristic vector together to obtain a comprehensive characteristic vector for identifying the second image, and determine the comprehensive characteristic vector as the third image characteristic.

16. The application server terminal according to claim 15, wherein the processor is further configured to:
joint the second characteristic vector and the first characteristic vector together by connecting a tail of the second characteristic vector with a head of the first characteristic vector, or by connecting a tail of the first characteristic vector with a head of the second characteristic vector.

17. The application server terminal according to claim 11, wherein the processor is further configured to:
perform similarity coefficient calculation on the second encryption key and the pre-stored first encryption key to obtain a first coefficient, and compare the first coefficient with a preset coefficient threshold value;
when the first coefficient is larger than the preset coefficient threshold value, determine that the second image passes authentication; and
when the first coefficient is smaller than the preset coefficient threshold value, determine that the second image fails to pass authentication.

18. The application server terminal according to claim 11, when the N image regions include first and second image regions, the first image region being separate from and spaced apart from the second image region, the first image region including a portion of the background information of the first image and the second image region including a portion of the foreground information of the first image.

19. A non-transitory computer-readable storage medium having stored thereon computer-executable instructions for executing an information processing method, the information processing method comprising:
obtaining, by an application server terminal, a first image from a user terminal;
generating and storing a first encryption key based on the first image to form a pre-stored first encryption key;
in response to an authentication request, presenting, on a screen of the user terminal, a portion but not entirety of the first image as authentication prompting information;
sending to the application server terminal, by the user terminal, a second image, the second image being a copy of the first image;
extracting a first image characteristic and a second image characteristic from the second image, wherein the first image characteristic represents background information of the first image, and the second image characteristic represents foreground information of the first image, the foreground information represents information of one or more objects in the first image which are acquired as a category of main objects during obtaining of the first image, and the background information represents information of the remaining portions of the first image excluding the category of the main objects;

obtaining a third image characteristic based on the first image characteristic and the second image characteristic, and determining the third image characteristic as a second encryption key;

performing similarity matching on the second encryption key and the pre-stored first encryption key to generate a matching result; and authenticating the second image according to the matching result.

20. The non-transitory computer-readable storage medium according to claim 19, when the N image regions include first and second image regions, the first image region being separate from and spaced apart from the second image region, the first image region including a portion of the background information of the first image and the second image region including a portion of the foreground information of the first image.

* * * * *